United States Patent [19]

Plaza-Meyer et al.

[11] Patent Number: 4,770,847

[45] Date of Patent: Sep. 13, 1988

[54] CONTROL OF DIFFERENTIAL GROWTH IN NUCLEAR REACTOR COMPONENTS BY CONTROL OF METALLURGICAL CONDITIONS

[75] Inventors: Elias Plaza-Meyer; Alan W. Fanning, both of San Jose, Calif.

[73] Assignee: General Electric Company, San Jose, Calif.

[21] Appl. No.: 383,808

[22] Filed: Jun. 1, 1982

[51] Int. Cl.⁴ .............................................. G21C 3/06
[52] U.S. Cl. ................................... 376/444; 148/133
[58] Field of Search ........................... 148/11.5 F, 133; 376/435, 444, 447, 457, 900; 176/76, 78

[56] References Cited

U.S. PATENT DOCUMENTS

| | | | |
|---|---|---|---|
| 2,894,866 | 7/1959 | Picklesimer | 148/133 |
| 3,486,219 | 12/1969 | Davies et al. | 148/11.5 F |
| 3,567,522 | 3/1971 | Thomas et al. | 148/11.5 F |
| 3,865,635 | 2/1975 | Hofvenstam et al. | 148/11.5 F |
| 4,238,251 | 12/1980 | Williams et al. | 376/457 |
| 4,239,597 | 12/1980 | Christiansen | 376/441 |

OTHER PUBLICATIONS

"Zirconium in the Nuclear Industry", by American Soc. for Testing and Materials.
Nuclear Reactor Material Handbook, by Nikkan Kogyo Shinbun-sha.
Nen-Ansen, No. 13 (1981), "Behaviors of Light Water Reactor Fuel", by Nuclear Safety Research Association.

Primary Examiner—Deborah L. Kyle
Assistant Examiner—Richard W. Wendtland
Attorney, Agent, or Firm—Robert R. Schroeder

[57] ABSTRACT

A process is disclosed for providing different irradiation growth rates between a first nuclear element cladding tube of an anisotropic metal and a second cladding tube of the same metal. The process comprises tailoring the tube fabrication of each to produce cladding tubes having a crystalline structure in a desired energy state. The desired energy state is brought about by regulating the size of the final cold-work reduction and the time and temperature of heat treatment following the final reduction. The process is utilized to produce substantially equivalent irradiation growth between fuel rods and water rods. The preferred anisotropic metals are alloys of zirconium.

4 Claims, 1 Drawing Sheet

U.S. Patent  Sep. 13, 1988  4,770,847
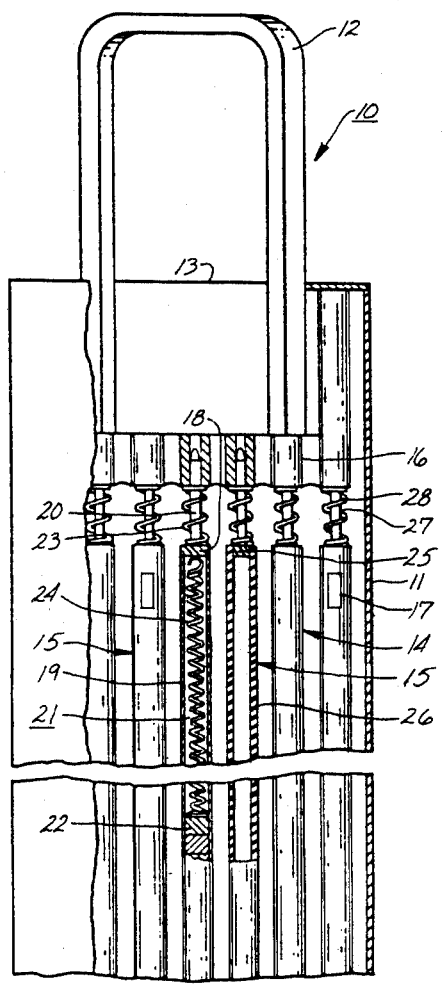

CONTROL OF DIFFERENTIAL GROWTH IN NUCLEAR REACTOR COMPONENTS BY CONTROL OF METALLURGICAL CONDITIONS

BACKGROUND OF THE INVENTION

Fuel assemblies in certain boiling water nuclear reactors contain fuel rods and water rods. Typically, cladding containers of both types of rods are made of zirconium alloys such as Zircaloy-2 and Zircaloy-4. The fuel rods contain fuel material, such as uranium dioxide pellets whereas the water rods have water flowing through them.

Under the conditions prevailing in an operating nuclear reactor, zirconium alloys exhibit a certain amount of irradiation growth. The amount of irradiation growth depends on many factors, including the alloy material, the temperature, neutron energy, and the neutron flux. Mechanical interaction between fuel pellets and the cladding container introduces a growth component in the fuel rods not present in water rods. This introduces an irradiation growth differential between fuel rods and water rods. As the radiation exposure increases, pellet-cladding mechanical interaction (PCMI) increases and as a result the difference in irradiation growth between fuel rods and water rods increases.

In such a nuclear fuel assembly the fuel rods are positioned lengthwise between upper and lower tie plates in which the ends of the fuel rods are secured, for example by means of end plugs having studs fitted into holes in the tie plates. Water rods are positioned lengthwise between the tie plates and are likewise secured by means such as end plugs with studs fitted into corresponding holes in the tie plate.

There is typically an axial irradiation growth differential among fuel rods and water rods. A small axial growth differential is accommodated, for example, by incorporation of expansion springs between the upper tie plate and the upper end of the fuel rod cladding. The expansion springs are disposed around a portion of the end plug studs.

The distance between the upper and lower tie plates increases according to the axial irradiation growth of the fuel rods. There is concern that the difference in axial irradiation growth between fuel rods and water rods may become too great to be accommodated by the expansion springs and may cause one or more end plug studs of water rods to release from the upper or lower tie plate.

SUMMARY OF THE INVENTION

In accordance with the invention there is a process for providing different irradiation growth rates between first and second cladding tubes made of anisotropic metals such as zirconium alloys. The process comprises regulating the crystallographic structure of each cladding tube wherein low irradiation growth occurs when the crystalline structure of the metal is in a low energy state or configuration and larger irradiation growth occurs when crystalline structure of the metal is in a higher energy state.

A preferred means for regulating the crystalline structure of the anisotropic metal in each cladding tube comprises tailoring the tube fabrication schedule to achieve the desired crystallographic structure.

More specifically, the process comprises forming a first cladding tube of an anisotropic metal, preferably a zirconium alloy by a first fabrication schedule. The final dimensions are achieved by a selected cold-work reduction, which imparts a high energy state to the crystalline structure of the metal. The final cold-work reduction is followed by heat treating the first cladding tube at a selected temperature and for a selected time to allow the metal to at least partialy recrystallize to a lower energy state.

A second cladding tube of the same metal as the first cladding tube is formed by a second fabrication schedule which includes a selected cold-work reduction to achieve given final dimensions which may be approximately the same as the first cladding tube. The second cladding tube may then be heat treated at a selected temperature and for a selected time sufficient to induce less recrystallization than the first cladding tube to thereby retain a higher energy state of the crystalline structure than that of the first tube.

The second cladding tube will display greater irradiation growth than the first cladding tube due to its higher energy state.

The energy state of the crystallographic structure of the metal is thus regulated by controlling the size of the final cold-work reduction in the tube fabrication schedule, the temperature of the heat treatment following the final cold-work reduction and the length of the heat treatment.

A preferred embodiment of this invention comprises controlling the irradiation growth of fuel rods and water rods in a water cooled reactor. Proper tailoring of the cladding tube fabrication schedules enables water rods, which typically undergo less irradiation growth than fuel rods under operating conditions of a boiling water reactor, to exhibit substantially equivalent irradiation growth as fuel rods.

BRIEF DESCRIPTION OF THE DRAWING

These and other features and advantages of the present invention will be better understood by reference to the following detailed description when considered in conjunction with the accompanying drawing wherein:

The drawing is a partial cutaway sectional view of a nuclear fuel assembly containing nuclear fuel rods and water rods constructed according to the teaching of this invention.

DETAILED DESCRIPTION

A primary application of this invention is the fabrication of nuclear fuel assemblies such as that illustrated in the drawing as a partially cutaway sectional view wherein the cladding containers of the water rods exhibit irradiation growth substantially equivalent to that of fuel rods under operating nuclear reactor conditions.

A nuclear fuel assembly 10 comprises a tubular flow channel 11 of generally square cross-section provided at its upper end with a lifting bail 12 on the upper tie plate and at its lower end with a nose piece (not shown due to the lower portion of assembly 10 being omitted). The upper end of the channel 11 is open at 13 and the lower end of the nose piece is provided with coolant flow openings. An array of alternating fuel rods 14 and water rods 15 is enclosed in the channel 11 and supported therein by means of an upper tie plate 16 and a lower tie plate (not shown due to the lower portion being omitted).

Liquid coolant ordinarily enters through the openings in the lower end of the nose piece and flows in part into the water rods through inlet holes (not shown) and passes upwardly through the water rods and discharges through outlet holes 17 of the water rods and outlet 13 of the channel at an elevated temperature. Coolant also passes upwardly within the channel in the space between the fuel and water rods. Coolant outside of the water rods typically is discharged from the channel through outlet 13 in at least a partially vaporized condition.

The nuclear fuel rods 14 are sealed at their ends by means of end plugs 18 welded to the cladding 19. The end plugs include studs 20 to facilitate the mounting of the fuel rod in the assembly. A void space or plenum 21 is provided at one end of the element to permit longitudinal expansion of pellets of fuel material 22 and accumulation of gases released from the fuel material. A nuclear fuel material retainer means 24 in the form of a helical member is positioned within the void space 21 to provide restraint against the axial movement of the pellet column, especially during handling and transportation of the fuel element. An expansion spring 23 is positioned between the top of each fuel rod and the upper tie plate to accommodate differential axial expansion among fuel rods and between fuel rods and water rods due to irradiation growth.

Nuclear water rods 15 are hollow and are sealed at their ends by means of end plugs 25 welded to the cladding 26. The end plugs include studs 27 which facilitate the mounting of the water rods in the assembly similarly to the fuel rods. The water rods comprise inlet holes (not shown) above the lower end plug and outlet holes 17 below the upper end plug 27. If it is desired to have the coolant enter or exit the water rods from selected radial directions, one or both end plugs may comprise studs of square cross section which are then inserted in tie plate holes of corresponding square cross section. Expansion springs 28 are also positioned between the top of each water rod cladding and the upper tie plate to accommodate a certain amount of differential irradiation growth between water rods and fuel rods.

The invention is particularly suited to anisotropic metals as isotropic metals undergo little or substantially no irradiation growth. Anisotropic metals are metals which display different properties along different crystallographic directions. The preferred anisotropic metals for application in nuclear reactors are alloys of zirconium. More preferably, the zirconium alloys are Zircaloy-2 and Zircaloy-4.

Zircaloy-2 has on a weight basis about 1.5% tin; 0.12% iron; 0.09% chromium and 0.005% nickel and is extensively used in water-cooled reactors. Zircaloy-4 has less nickel than Zircaloy-2 and contains slightly more iron but is otherwise the same as Zircaloy-2.

Claddings of the fuel rods and water rods in fuel assemblies such as described above can be fabricated in accordance with principles of the present invention.

The claddings are fabricated by mechanical cold-work reductions from a tube shell. The tube shell is typically extruded from a hollow billet of the material.

Cold-work reductions can be accomplished by various techniques such as a rocking process in a Pilger mill or machine. In a Pilger machine the thick-walled tube shell is passed through special rolls. These rolls vary in cross sectional shape around their circumference so that the distance between the rolls varies when the rolls rotate. The tube is fixed to a mandrel and is then gripped by a section of the rolls having a greater radius. As the tube advances between the rolls, the wall thickness of the tube is reduced until the rolls have rotated to such an extent that the part of their cross section having a lesser radius is reached and the tube is thus no longer gripped. The tube is then pulled back a select distance wherein again a thick-walled portion of the tube is gripped by the section of the rolls having the greater radius. The mandrel is continuously rotated in order to insure uniform application of the roll pressure around the tube.

Several cold-work reduction passes are generally performed to achieve the final dimension of the tube. After each reduction pass, the tube shell is cleaned and heat treated.

The severe cold working that takes place in the tube reduction results in distortion of the shapes of the metal crystallites and produces many crystal defects within the crystallites. Cold-worked metals are in a relatively high energy state which is not thermally stable. Heat treatment subsequent to a cold-work reduction pass uses heat to impart mobility to the atoms of the metal and allows them to rearrange themselves into a lower energy state. This is referred to as recrystallization and is a function of both temperature and time, with temperature being the more sensitive parameter.

According to the practice of this invention, the tube fabrication schedules differ between fuel rods and water rods. After achieving the final dimensions by a final cold-work reduction pass, fuel rods typically undergo a heat treatment wherein the time and temperature are selected to be sufficient to provide substantially complete recrystallization but insufficient to allow excessive crystalline grain growth. In the case of zirconium alloys, suitable temperatures and times for this heat treatment or annealing step are in the ranges from about 1000° F. to about 1300° F. for about 1 to 15 hours and preferably for about 2 to 5 hours.

After achieving final dimensions by a final cold-work reduction pass, water rods are heat treated at a time and temperature which imparts less recrystallization to the alloy than in the fuel rods. Preferably, the heat treatment is selected to provide partial recrystallization, i.e., stress relief, but not full recrystallization of the metal crystalline structure. For zirconium alloys, preferable temperatures for this heat treatment are from about 825° F. to about 950° F. for about 1 to 4 hours.

The degree of axial or longitudinal expansion due to irradiation is dependent upon the amount of recrystallization that takes place in the final heat treatment step which determines the energy state of the cladding tube. A completely recrystallized tube has less irradiation growth than a tube that is only partially recrystallized. A fuel rod is subject to elongation in a neutron flux due to two effects, irradiation-induced changes in the crystallographic condition of the metal in the tube and pellet-cladding mechanical interaction. A water rod is subject only to irradiation-induced crystallographic changes. By only partially recrystallizing the metal in the water rods, the elongation due to crystallographic changes is enhanced so that the elongation of the water rods can more closely approximate the elongation due to the sum of the effects operating on fuel rods.

The energy state may also be varied, in addition to the final heat treatment, by the degree of the cold-work reduction in the final reduction pass. A large reduction of the wall thickness imparts greater distortions and crystal defects and causes the metal to be in a relatively higher energy state than a smaller reduction. Therefore, it may be desirable to vary the number of cold-work reductions before achieving the desired final dimensions between fuel and water rods so that the size of the final reduction imparts the desired amount of crystal defects to a tube, thereby inducing a selected energy level to the crystalline structure of that tube. By use of a greater cold reduction, a larger inherent irradiation growth potential can be left in a water rod than in a fuel rod having a lesser cold reduction in the final stage of tube forming.

The final energy level of a cladding tube results from the combination of cold-work reduction and heat treatment. The two factors are interdependent so that an excessive cold-work reduction may be compensated for by a longer or hotter heat treatment to achieve the desired energy level.

For example, in order to produce fuel rods and water rods having substantially equivalent irradiation growth in a boiling water reactor, the following described tube fabrication schedules can be used.

A first cladding tube for a fuel rod is fabricated from a billet of Zircaloy-2 alloy conforming to ASTM B353, grade RA-1. The billet is machined and cleaned and has dimensions of approximately 9.0 inches length, about 5.74 inches outside diameter and about 1.66 inches inside diameter.

The billet is extruded into a cladding tube shell using an extrusion rate of about 6 inches per minute, a reduction ratio of about 6:1, a temperature of about 1100° F. and an extrusion force of about 3500 tons. All billet surfaces except the bore and floating mandrel are lubricated with a water-soluble lubricant.

The final reduction of the tube shell is accomplished by cold work reductions in a Pilger machine.

The tube shell before reduction has an outside diameter of about 2.5 inches and a wall thickness of about 0.43 inches. The tube shell is cleaned with a degreaser and then a soap-based alkaline solution. The tube shell is annealed for about 1 hour at approximately 1150° F.

A first reduction pass in the Pilger machine is made and produces a tube shell with an outside diameter of about 1.45 inches and a wall thickness of about 0.22 inches. The shell is then cleaned as before and annealed for about 1 hour at about 1150° F.

A second reduction pass in the Pilger mill is made and generates a tube with an outside diameter of 0.8 inches and a wall thickness of 0.095 inches. Again, the tube is cleaned and annealed for about 1 hour at about 1150° F.

The first tube shell for making a fuel rod then undergoes a third and final reduction in the Pilger mill in which an approximately 76% reduction in wall thickness is made to provide a first cladding tube having an outer diameter of 0.495 inches and a wall thickness of 0.035 inches. The tube is again cleaned and annealed at about 1070° F. for about 2.5 hours to provide the final product.

A second cladding tube of Zircaloy-2 to be used as a water rod is fabricated as described above for a fuel rod through the second reduction pass in the Pilger machine. After the second reduction pass, the tube shell is cleaned with a degreaser and a soap-base alkaline solution. The tube shell is then annealed for about 1 hour at about 1150° F.

A third reduction pass through the Pilger mill in which about a 60% reduction in wall thickness is made forms a tube shell having an outer diameter of about 0.62 inches and a wall thickness of 0.037 inches. The tube is again cleaned as before and annealed for about 1 hour at about 1150° F.

A fourth and final reduction pass through the Pilger mill in which about a 20% reduction in wall thickness is made produces a second cladding tube having an outer diameter of 0.593 inches and a wall thickness of 0.031 inches.

Following the final cold-work reduction, the second cladding tube is heat treated for about 4 hours at about 950° F.

Both cladding tubes are then cut to length and fabricated into fuel and water rods, respectively.

What is claimed is:

1. A nuclear fuel assembly comprising water rods and fuel rods having substantially equivalent irradiation growth wherein:
   the fuel rods comprise cladding tubes of a zirconium alloy formed by a first tube fabrication schedule wherein the final dimensions are achieved by cold-work reduction followed by heat treating the tube for about 1 to about 15 hours at about 1000° F. to about 1300° F.; and
   the water rods comprise cladding tubes of a zirconium alloy substantially the same as in the fuel rod cladding tubes and formed by a second tube fabrication schedule wherein the final dimensions are achieved by cold-work reduction followed by heat treating the tube for about 1 to about 4 hours at about 825° F. to about 950° F.

2. A nuclear fuel assembly as recited in claim 1 wherein the fuel rod cladding tube is heat treated for about 1 to about 4 hours at about 1000° F. to about 1300° F.

3. A nuclear fuel assembly as recited in claim 1 wherein the select cold-work reduction in the second tube fabrication schedule comprises about a 20 percent reduction in the thickness of the tube wall.

4. A nuclear fuel assembly comprising water rods and fuel rods having substantialy equivalent irradiation growth wherein:
   the fuel rods comprise cladding tubes of a zirconium alloy formed by a first fabrication schedule wherein the final dimensions are achieved by about a 76% cold-work reduction in the thickness of the cladding wall followed by heat treating the tube for about 2.5 hours at about 1070° F.; and
   the water rods comprise cladding tubes of a zirconium alloy substantially the same as in the fuel rod cladding tubes formed by a second fabrication schedule wherein the final dimensions are achieved by about a 20% cold-work reduction in the thickness of the cladding tube wall followed by heat treating the tube for about 4 hours at about 950° F.

* * * * *